United States Patent
Opolka

(10) Patent No.: US 7,658,520 B2
(45) Date of Patent: Feb. 9, 2010

(54) VEHICLE FLASHLIGHT WITH CHARGER

(75) Inventor: Rainer Opolka, Solingen (DE)

(73) Assignee: Zweibruder Optoelectronics GmbH, Solingen (DE)

( * ) Notice: Subject to any disclaimer, the term of this patent is extended or adjusted under 35 U.S.C. 154(b) by 0 days.

(21) Appl. No.: 12/064,106

(22) PCT Filed: Aug. 12, 2006

(86) PCT No.: PCT/DE2006/001416

§ 371 (c)(1),
(2), (4) Date: Feb. 19, 2008

(87) PCT Pub. No.: WO2007/025504

PCT Pub. Date: Mar. 8, 2007

(65) Prior Publication Data

US 2008/0304256 A1    Dec. 11, 2008

(30) Foreign Application Priority Data

Aug. 30, 2005    (DE) .................. 20 2005 013 633 U

(51) Int. Cl.
*F21L 4/00*    (2006.01)
*B60Q 1/00*    (2006.01)

(52) U.S. Cl. .................. 362/488; 362/489; 362/183

(58) Field of Classification Search .................. 362/183, 362/486–489, 652, 655–658, 202, 205, 208; 320/114–115, 207
See application file for complete search history.

(56) References Cited

U.S. PATENT DOCUMENTS

| | | | |
|---|---|---|---|
| 3,749,905 A | 7/1973 | Friedman et al. | ........... 240/10.6 |
| 4,819,139 A * | 4/1989 | Thomas | ...................... 362/183 |
| 6,538,236 B1 * | 3/2003 | Rostan | ...................... 219/267 |
| 7,281,814 B2 * | 10/2007 | Sheen | ........................ 362/183 |
| 7,461,959 B2 * | 12/2008 | Baldauf et al. | .............. 362/488 |
| 2006/0152945 A1 | 7/2006 | Lantzsch et al. | ............ 362/640 |

FOREIGN PATENT DOCUMENTS

| | | |
|---|---|---|
| DE | 732 364 | 3/1943 |
| DE | 3636968 | 2/1997 |
| DE | 202004011722 | 1/2005 |
| DE | 202004018685 | 3/2005 |
| WO | WO 8703354 | 6/1987 |

* cited by examiner

*Primary Examiner*—Thomas M Sember
(74) *Attorney, Agent, or Firm*—Andrew Wilford

(57) ABSTRACT

The invention relates to a torch (1) having rechargeable batteries and contacts (3) on the housing outer surface (4), via which a closed circuit with a battery charging device (2) can be produced, said device being provided with an adapter plug for connection to a passenger vehicle or goods vehicle outlet, in particular a cigarette lighter socket (8). According to the invention, the battery charging device has a pot-shaped or sleeve-shaped housing (6), into which the torch (1) can be plugged such that contacts (7) on the inner surface of the housing (6) bear against the contacts (3) of the housing outer wall (4) of the torch (1).

7 Claims, 1 Drawing Sheet

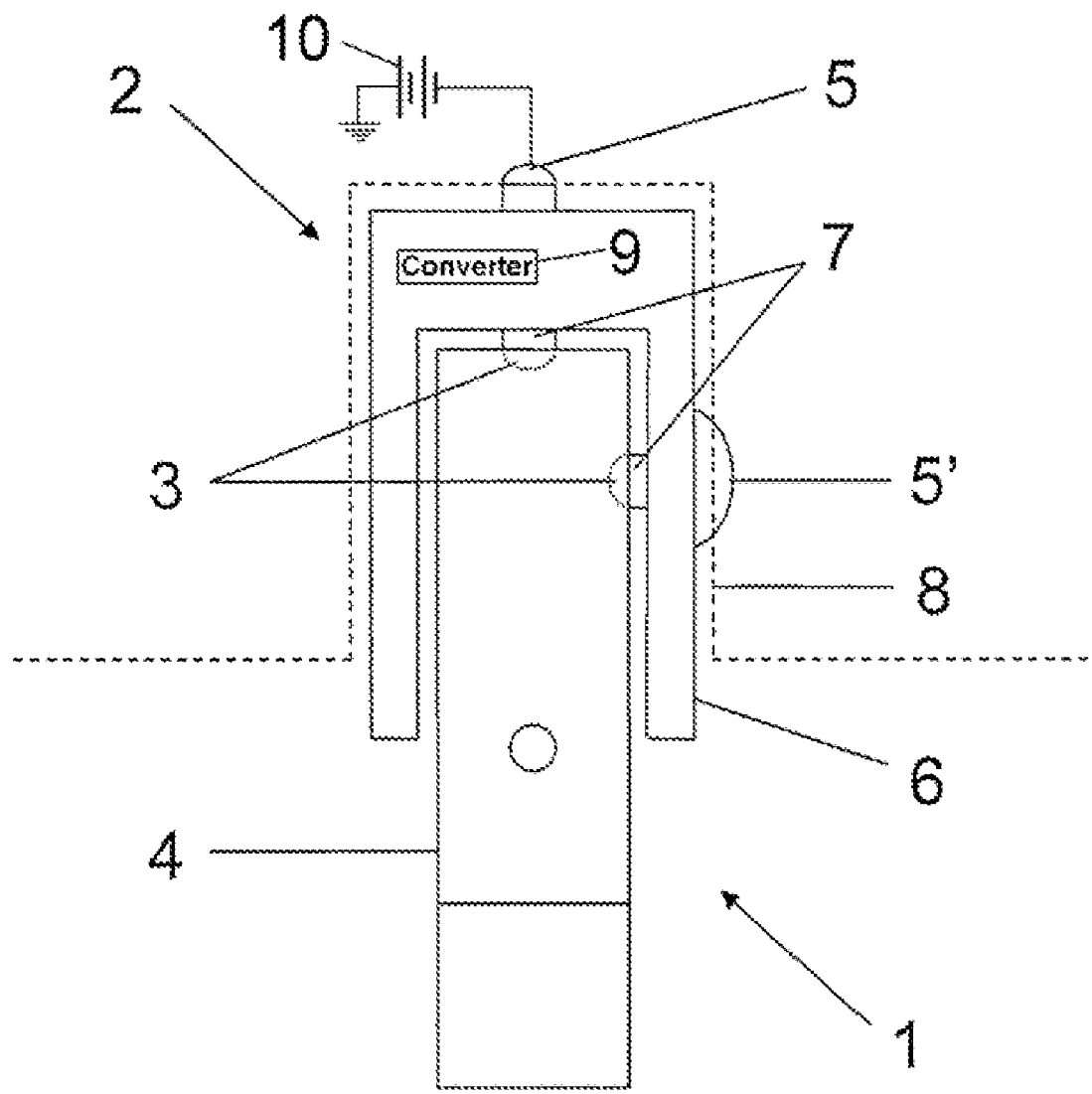

VEHICLE FLASHLIGHT WITH CHARGER

CROSS REFERENCE TO RELATED APPLICATIONS

This application is the US national phase of PCT application PCT/DE2006/001416, filed 12 Aug. 2006, published 8 Mar. 2007 as WO2007/025504, and claiming the priority of German patent application 202005013633U itself filed 30 Aug. 2005 and European patent application 1779027B1 itself filed 24 Oct. 2007, whose entire disclosures are herewith incorporated by reference.

FIELD OF THE INVENTION

The invention relates to a flashlight with rechargeable batteries and contacts on the outer surface of its housing via which a closed circuit can be produced with a battery charger provided with an adapter plug for connection to a car or truck socket, in particular a cigarette lighter socket.

BACKGROUND OF THE INVENTION

Portable flashlights are normally used only seldom but are an indispensable aid in exceptional instances such as, e.g. a current outage in the home, on unlit paths, for illuminating doorbell signs, house numbers or the like, or in the case of a breakdown for illuminating the engine area or the like.

The earlier customary use of incandescent bulbs allowed the battery capacity to die down relatively quickly so that in certain instances the residual capacity of the batteries was no longer sufficient to generate a sufficiently large voltage.

A significant improvement was already achieved in that the incandescent bulb was replaced by a light-emitting diode. Light-emitting diodes require considerably less current for operation so that the total illumination time per battery set is correspondingly greater.

In addition, in contrast to incandescent bulbs light-emitting diodes are relatively resistant to impacts and jolts so that their service life is also multiply lengthened. Finally, light-emitting diodes are smaller than incandescent bulbs so that a distinct miniaturization of the flashlight was able to be achieved in conjunction with the lower current requirement. This even went so far that small flashlights had a diameter that was less than 1 cm and the length of the flashlights was 5 cm or less. Such flashlights can be carried on key rings, so that they are there when needed.

Other potential savings with flashlights result from the use of rechargeable batteries that, although they are more expensive than disposable batteries, can be recharged many times.

Chargers known from the state of the art are used for recharging that are usually set up for connection to a power outlet and have compartments for several batteries and that can also have different shapes. For recharging, the batteries must be removed from the flashlight and inserted into the charger, that then remains connected to the power for several hours before the batteries are available again.

DE 732 364 describes a charger and flashlight with built-in battery suitable for connection to line. The flashlight head and the externally exposed charge contacts of the rod-shaped flashlight can be set in a cup-shaped compartment of the charger in such a manner that they can be anchored in a certain position in a bayonet manner, during which a closed contact is made between the contacts of the charger and of the flashlight.

U.S. Pat. No. 3,749,905 describes a charger for the batteries of a flashlight that has a line connection at whose end is a plug that can be inserted into the socket of a car cigarette lighter. The charger housing has contact seats that can be connected to corresponding contacts of the flashlight on its outer housing in order to close the circuit for recharging the batteries. This apparatus has the disadvantage that the charger must either be fastened to a console in the car so that it is optically disturbing even when not in use charging. As an alternative, the charger can be set in the foot space or on the passenger seat; however, such movable parts are undesired on account of the increased danger of an accident during sharp braking or rapid curve travel.

DE 36 36 968 C2 describes a rechargeable flashlight consisting of a central part containing a battery and a double charge circuit and comprising a line plug arrangement on one end and on the opposite end an adapter plug for a car socket, especially a cigarette-lighter connection. Furthermore, this flashlight comprises a reflector part that can be coupled to the central part and that extends over the adapter plug as well as comprises a plug cap that covers the line plug and in which an apparatus for separating the accessible contacts of the adapter plug is arranged in the central part, which apparatus is active during the charging of the battery via the line plug arrangement. According to the invention a switch that can be activated via a plunger is provided for separating the adapter plug from the line voltage during charging of the battery via the line plug arrangement, which switch is intended to ensure that it is opened at the beginning of the drawing off of the cap covering the accessible contacts and of the reflector part, thus interrupting the electrical connection between these contacts and the line voltage. However, this arrangement has the disadvantage of taking up quite a bit of space.

OBJECT OF THE INVENTION

The present invention has the object of further developing the initially described flashlight with battery part to a shape and size that can be better handled.

SUMMARY OF THE INVENTION

This object is attained in that the battery charger is a can-shaped or casing-shaped housing into which the flashlight can be inserted in such a manner that contacts on the inner part of the housing rest on the contacts of the outer housing wall of the flashlight. The flashlight housing is preferably substantially cylindrical and extends only partially out of the casing-shaped housing of the battery charger in the inserted position.

The advantages of the above-described design are in particular the fact that the battery charger can remain permanently in the cigarette lighter, where it is not a problem on account of its casing-shaped design, not even when the rod-shaped flashlight is inserted into this charger. To the extent that the charger cuts off the current when the maximal charging capacity of the battery has been reached, the rod-shaped flashlight can remain permanently in the charger and thus in the cigarette lighter. In this manner the flashlight is advantageously always available and always charged. When using NiCd or similar batteries that display the so-called memory effect, a system for periodic obligatory discharge of the battery to a value at which the batteries are partially discharged but still supply a residual voltage that is sufficiently large for the operation of a flashlight can also be provided in the battery charger. In particular, the flashlight should be equipped with a light-emitting diode, which further minimizes the current requirements.

The cigarette lighter of an automobile is frequently no longer used, either because smoking is viewed as disturbing and dangerous in traffic during travel or because a large part of the population does not smoke. The cigarette lighter is usually set at a readily accessible location in the car so that a flashlight placed in the charger is always available, for example for illuminating a dark path, doorbell signs, the engine area, etc. after getting out. After use, the flashlight can be returned to the casing-shaped charger receptacle.

BRIEF DESCRIPTION OF THE DRAWING

The sole FIGURE of the drawing schematically illustrates an embodiment of the flashlight in accordance with the invention.

SPECIFIC DESCRIPTION

The drawing shows a flashlight 1 with a cylindrical housing 4 inserted in a can-shaped housing 6 of a battery charger 2. Contacts 3 contacts connected to a vehicular power source illustrated schematically at 10 are mounted on the outside of the flashlight housing 4 and brought into electrical engagement with contacts 7 mounted on the inside of the can-shaped housing 6 when the flashlight 1 is inserted into the can-shaped housing 6 of the battery charger 2. The interior of the can-shaped housing 6 is complementary to the size and the shape of the cylindrical housing 4 of the flashlight 1 in such a manner that a frictional connection prevents the flashlight 1 from slipping out. In addition, there is the possibility of designing the side contact 7 of the can-shaped housing 6 elastically so that it snaps when the flashlight is inserted into a respective recess of the housing cylinder 4 where one of the contacts 3 is recessed.

The can-shaped housing 6 of the battery charger 2 is inserted for its part into the cigarette lighter socket 8 (dotted line) of a motor vehicle and outer contacts 5 and 5' of the battery charger 2 engage into corresponding seats of the cigarette lighter socket 8. The contacts 5 and 5' include a central pin 5 on the end of the housing 6 and a spring contact 5' on the side of the housing 6. The frictional connection between the socket 8 and the can-shaped housing 6 as well as the engagement of the spring contact 5' prevent the battery charger from slipping out.

The battery charger 2 assumes not only the function of an adapter by means of which a flashlight 1 with a relatively small housing diameter can be inserted into the larger-diameter cigarette-lighter socket 8 but also ensures with an integrated transformer 9 that the voltage present in the cigarette lighter socket 8 is converted into an appropriate charge voltage for the batteries (not shown). Once the maximal charging capacity of the batteries has been reached, the battery charger 2 automatically turns off so that it is safe for the flashlight 1 to remain inserted in the cigarette lighter for a rather long time. Since the cylindrical housing 4 of the flashlight 1 can be introduced to at least up to one half or—depending on the size of the flashlight—more into the can-shaped housing 8, it causes no problem. The front housing section of the flashlight 1 stands out just enough that the flashlight is easy to grasp in order to be readily available if needed.

The invention claim is:

1. In a vehicle, in combination:
    a lighter receptacle having inwardly directed receptacle contacts connected to a vehicle power source;
    a sleeve-shaped charger fittable in the lighter receptacle and having outwardly directed charger contacts engageable with the receptacle contacts when the charger is fitted in the lighter receptacle and inwardly directed charger contacts; and
    a flashlight having
        a housing fittable in the charger,
        rechargeable batteries in the housing,
        a light source energizable to emit light by the batteries, and
        flashlight contacts exposed on an outside surface of the housing and engageable with the inwardly directed charger contacts when the housing is fitted in the charger.

2. The combination defined in claim 1 wherein the housing is generally cylindrical and the charger has a generally cylindrical and complementary inner surface.

3. The combination defined in claim 1 wherein the light source includes at least one light-emitting diode.

4. The combination defined in claim 1 wherein the housing is generally cylindrical and the charger has generally cylindrical inner and outer surfaces, the housing and charger being centered on a common axis, one of the outwardly directed charger contacts projecting axially from an end of the charger and the other of the outwardly directed charger contacts being exposed radially of the axis.

5. The combination defined in claim 4 wherein the charger is formed with a recess in which the radially exposed contact is provided.

6. The combination defined in claim 5 wherein the other charger contact is elastically deflectable and retains the charger releasably in the lighter receptacle.

7. The combination defined in claim 1, further comprising a converter in the charger for converting voltage at the receptacle contacts equal to that of the vehicle power source to a voltage at the inner charger contacts suitable for charging the batteries of the flashlight.

\* \* \* \* \*